US008194079B2

United States Patent
Baraff et al.

(10) Patent No.: US 8,194,079 B2
(45) Date of Patent: *Jun. 5, 2012

(54) INERTIAL FIELD GENERATOR: A METHOD FOR CONTROLLABLY COUPLING KINEMATIC CHARACTER MOTIONS TO DYNAMICALLY SIMULATED ELEMENTS

(75) Inventors: David E. Baraff, Emeryville, CA (US); Andrew Witkin, Emeryville, CA (US)

(73) Assignee: Pixar, Emeryville, CA (US)

( * ) Notice: Subject to any disclaimer, the term of this patent is extended or adjusted under 35 U.S.C. 154(b) by 997 days.

This patent is subject to a terminal disclaimer.

(21) Appl. No.: 11/735,230

(22) Filed: Apr. 13, 2007

(65) Prior Publication Data

US 2007/0257921 A1    Nov. 8, 2007

Related U.S. Application Data

(63) Continuation of application No. 09/750,100, filed on Dec. 29, 2000, now Pat. No. 7,206,729.

(51) Int. Cl.
*G06T 13/00* (2011.01)
*G06F 7/60* (2006.01)
*G06G 7/48* (2006.01)

(52) U.S. Cl. ............ 345/473; 345/474; 345/475; 703/7; 703/2

(58) Field of Classification Search ........................ None
See application file for complete search history.

(56) References Cited

U.S. PATENT DOCUMENTS

| 5,511,158 | A | * | 4/1996 | Sims | .............................. 345/440 |
| 5,594,856 | A | | 1/1997 | Girard | |
| 5,680,532 | A | * | 10/1997 | Amakawa et al. | ............. 345/473 |
| 5,764,233 | A | * | 6/1998 | Brinsmead et al. | ........... 345/419 |
| 5,777,619 | A | * | 7/1998 | Brinsmead | ..................... 345/419 |
| 5,892,691 | A | | 4/1999 | Fowler | |
| 5,912,675 | A | | 6/1999 | Laperriere | |
| 5,982,390 | A | | 11/1999 | Stoneking et al. | |
| 6,008,818 | A | * | 12/1999 | Amakawa et al. | ............. 345/473 |
| 6,067,096 | A | * | 5/2000 | Nagle | ............................. 345/473 |
| 6,144,385 | A | | 11/2000 | Girard | |
| 6,195,625 | B1 | * | 2/2001 | Day et al. | .......................... 703/7 |
| 6,326,963 | B1 | | 12/2001 | Meehan | |
| 6,559,849 | B1 | | 5/2003 | Anderson et al. | |
| 6,563,503 | B1 | * | 5/2003 | Comair et al. | ................. 345/473 |
| 6,708,142 | B1 | * | 3/2004 | Baillot et al. | ...................... 703/2 |
| 6,720,962 | B1 | | 4/2004 | Alter | |
| 6,738,065 | B1 | | 5/2004 | Even-Zohar | |
| 6,909,431 | B1 | | 6/2005 | Anderson et al. | |

(Continued)

OTHER PUBLICATIONS

O'Brian et al. Combining Active and Passive Simulations for Secondary Motion. ACM SIGGRAPH 97 Visual Proceedings: The Art and Interdisciplinary Programs of SIGGRAPH '97. 1997.*

(Continued)

*Primary Examiner* — Tize Ma
(74) *Attorney, Agent, or Firm* — Kilpatrick Townsend & Stockton LLP

(57) ABSTRACT

A method is described to let animators control the extent by which kinematically scripted character motions affect dynamically simulated objects' motions. The dynamic objects are connected to the kinematic character, such as clothing or hair, and the motion of the dynamic objects is simulated based on the motion of the kinematic character. Such control is important to produce reasonable behavior of dynamic objects in the presence of physically unrealistic kinematic character motion. An Inertial Field Generator (IFG) is employed to compensate for the unreasonable behavior of dynamic objects when the kinematic character undergoes unrealistic motion.

20 Claims, 3 Drawing Sheets

U.S. PATENT DOCUMENTS 6,952,218 B1 * 10/2005 Bruderlin ............... 345/581

OTHER PUBLICATIONS

Iones et al. Fur and Hair. Practical Modeling and Rendering Techniques. Proceedings of the International Conference on Information Visualisation. 2000.*

Kurihara et al. Hair Animation with Collision Detection. In Models and Techniques in Computer Animation. 1993.*

Baraff. Issues in Computing Contact Forces for Non-Penetrating Rigid Bodies. Algorithmica. 1993.*

Baraff. Linear-Time Dynamics using Lagrange Multipliers. Proceedings of the 23rd Annual Conference on Computer Graphics and Interactive Techniques. 1996.*

Terzopoulos et al. Physically-Based Modeling: Past, Present, and Future. SIGGRAPH 89 Panel Proceedings. 1989.*

Turner et al. The Elastic Surface Layer Model for Animated Character Construction. Proceedings of Computer Graphics International. 1993.*

J.K. Hodgins, J.F. O'Brien, J. Tumblin, Perception of human motion with different geometric models, Visualization and Computer Graphics, IEEE Transactions on vol. 4 , Issue: 4, Oct.-Dec. 1998 , pp. 307-316.*

Ascher, U., and Boxerman, E. 2002. On the modied conjugate gradient method in cloth simulation. (submitted to) The Visual Computer 19:526-531.

Baraff, D., and Witkin, A. 1998. Large steps in cloth simulation. Computer Graphics (Proc. SIGGRAPH), 1-12.

Berney, J., and Redd, J. 2000. Stuart Little. SIGGRAPH Course Notes, ACM SIGGRAPH, ch. Costumes.

Breen, D., House, D., and Wozny, M. 1994. Predicting the drape of woven cloth using interacting particles. Computer Graphics (Proc. SIGGRAPH), 365-372.

Bridson, R., Fedkiw, R., and Anderson, J. 2002. Robust treatment of collisions, contact, and friction for cloth animation. Computer Graphics (Proc. SIGGRAPH), 594-603.

Carignan, M., Yang, Y., Magenenat-Thalmann, N., and Thalmann, D. 1992. Dressing animated synthetic actors with complex deformable clothes. Computer Graphics (Proc. SIGGRAPH), 99-104.

Chadwick, et al., "Layered Construction for Deformable Animated Characters," Computer Graphis. vol. 23, No. 3, 1989, pp. 243-252.

Choi, K., and Ko, H. 2002. Stable but responsive cloth. Computer Graphics (Proc. SIGGRAPH), 604-611.

Cordier et al., "Integrated System for Skin Deformation," MIRALab, University of Geneva, Computer Animation 2000 (CA'00), 2000. pp. 2-8.

Cordier, F., Volino, P., and Thalmann, N. 2002. Integrating deformations between bodies and clothes. The Journal of Visualization and Computer Animation 12:45-53.

Derose, T., Kass, M., and Truon, T. 1998. Subdivision surface in computer animation. Computer Graphics (Proc. SIGGRAPH), 85-94.

Eberhardt, B., Weber, A., and Strasser, W. 1996. A fast, flexible, particle-system model for cloth draping. IEEE Computer Graphics and Applications 16:52-59.

Gottschalk, S., Lin, M., and Manocha, D. 1996. OBBTree: A hierarchical structure for rapid interference detection. Computer Graphics (Proc. SIGGRAPH), 171-180.

Krishnan, S., and Manocha, D. 1997. An efficient surface intersection algorithm based on lowerDimensional formulation. ACM Transactions on Graphics 16, I (Jan.), 76-106. ISSN 0730-0301.

Lander, Skin Them Bones: Game Programming for the Web Generation, May 1998, Game Developer (www.gdmag.com), pp. 11-16.

Lander, Slashing through Real-Time Character Animation, Apr. 1998, Game Developer (www.gdmag.com), pp. 13-16.

Meyer, M., Debunne, G., Desbrun, M., and Barr, A. 2001. Interactive animation of clothlike objects in virtual reality. The Journal of Visualization and Computer Animation 12:1-12.

Patrikalakis, N. 1993. Surface-to-surface intersections. IEEE Computer Graphics and Applications 13, 1, 89-95.

Popovic, et al., "Physically-based Motion Transformation," Siggraph 99, Los Angeles Aug. 8-13, 1999, pp. 1-10.

Popovic, Z, "Controlling Physics in Realistic Character Animation," ACM Jul. 2000, pp. 51-59.

Provot, X., 1995. Deformation constraints in a massspring model to describe rigid cloth behavior. In Graphics Interface, Graphics Interface, 147-155.

SIGGRAPH '95, Introduction to Physically-Based Modelling, 22nd International Conferencing on Computer Graphics and International Techniques, Los Angeles, CA, Aug. 1995.

Stoeger et al., How to Create Long Hair with Maya Paint Effects and Maya Cloth, Alias/Wavefront, Corporate Overview, 4 pages.

Terzopoulos, D., and Fleischer, K. 1988. Deformable models. Visual Computer 4, 306-331.

Terzopoulos, D., Platt, J., Barr, A., and Fleischer, K. 1987. Elastically deformable models. Computer Graphics (Proc. SIGGRAPH) 11:205-214.

Thalman, N. et al., "Computer Animation," ACM, 1996, pp. 161-163.

Thalmann, N. et al., "Virtual Clothes, Hair and Skin for Beautiful Top Modesl," IEEE 1996, pp. 132-141.

Volino, P., Courchesne, M., and Magnenat Thalmann, N. 1995. Versatile and efficient techniques for simulating cloth and other deformable objects. Computer Graphics (Proc. SIGGRAPH), 137-144.

Watt et al., "Advanced Animation and Rendering Techniques" ACM Press, 1992, pp. 418-420.

Westenhofer, et al. "Using Kinematic Clones to Control the Dynamic Simulation of Articulated Figures," Rhythm 7 Hues Studios, Los Angeles, 1996, pp. 26-35.

Wikin, et al., "Interactive Manipulation of Rigid Body Simulations," ACM Jul. 2000, pp. 209-217.

Witkin, A. et al., "Global Methods for Simulating Contacting Flexible Bodies," IEEE 1994, pp. 1-12.

Witkin, A. et al., "Large Step in Cloth Simulation," ACM 1998, pp. 43-54.

Woolen, W, et al., "Animating Human Athletics," ACM, 1995, pp. 71-78.

* cited by examiner

INERTIAL FIELD GENERATOR: A METHOD FOR CONTROLLABLY COUPLING KINEMATIC CHARACTER MOTIONS TO DYNAMICALLY SIMULATED ELEMENTS

CROSS-REFERENCES TO RELATED APPLICATIONS

This application is a continuation application of and claims priority to U.S. Application Ser. No. 09/750,100, filed on Dec. 29, 2000 and entitled "INERTIAL FIELD GENERATOR: A METHOD FOR CONTROLLABLY COUPLING KINEMATIC CHARACTER MOTIONS TO DYNAMICALLY SIMULATED ELEMENTS", the entire disclosure of which is herein incorporated by reference for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to animation and more specifically to computer animation of characters. The present invention is also directed to providing animators with greater control over aspects of the character to produce reasonable changes in those aspects even when the character undergoes unrealistic motion.

DESCRIPTION OF THE RELATED ART

Traditional animation techniques allow the animator to create the apparent motion of animated characters, to be viewed by a viewer of the animation. The use of computers to simplify the animation process has provided many benefits to the traditional hand-drawn process. Computer animated characters are well known in the prior art and have been used in many different capacities. Such characters are utilized in traditional movies, videos and online streaming of moving pictures, as well as interactive movies where the motion of characters is often initiated by a user.

Often times in the animation of characters, the characters have "secondary elements", such as clothing and hair, that are responsive to main motion of the characters. The motions of some secondary elements in computer graphics imagery are often too complex for an animator to directly control. Instead of a human animator determining the motion of these secondary elements, computer programs use physically-based numerical methods that simulate the motion of these secondary elements (such as hair or cloth) over time.

This is accomplished by modeling the physical properties of these dynamic elements (how the cloth bends due to forces or collisions with solid objects, how the hair deforms or collides with itself), the external forces on these elements (gravity, wind) and the motions of the kinematic elements (the characters that cloth rests on or that the hair grows out of). The animation of the kinematic elements is provided by the animator and is independent of and unaffected by anything that the dynamic elements do.

For concreteness, consider an animation of a superhero wearing a long cape: The superhero (the kinematic element, Captain IFG), FIG. 1a, is directly animated by a skilled human animator, while the motion of the superhero's cape (the dynamic element) in response to the superhero's animation is simulated using physically-based numerical techniques.

If the physical properties and external forces acting on the dynamic elements are accurately modeled, the resulting motion will be plausible and seemingly realistic: cloth will hang down and fold naturally, hair will droop or blow in the wind. However, it is often the case that the kinematic elements (the primary characters of the scene) may be animated in a physically exaggerated manner, yet this requires the dynamic elements to essentially ignore this exaggeration and continue to behave in a realistic manner.

As an example assume the superhero stands motionless for a moment, then abruptly accelerates upward at 100G's (98,000 cm/s2). See FIG. 1b. His cape, tied around his neck, drapes down his back while the superhero is motionless, but must then react to the superhero's enormous upward motion. The result of the simulation program in this situation is to accelerate the portions of the cape around the superhero's neck along with the superhero.

The rest of the cape, unfortunately, does not fare so well; the physical properties of the cloth dictate that the superhero will have moved a large distance before the bottom edge of the cape "realizes" that the top edge around his neck has moved. This delay is caused because forces do not propagate instantly through cloth. Equivalently, one can think of the cape suddenly weighing 100 times more than it used to, so it initially stretches to many times its normal length.

While physically correct, this is not the desired behavior of the cape. Because of this effect, an animator must change the response of the dynamic elements to achieve the desired result. As discussed above, the dynamic elements are oftentimes complex and difficult for the animator to control. This is often frustrating for the animator, since the animator has achieved the proper motion of the kinematic elements and should not have to deal with unrealistic motion of the dynamic elements that are simulated by physically-based numerical techniques.

BRIEF SUMMARY OF THE INVENTION

Accordingly, it is a principal object of the present invention to provide a method to allow an animator to control how kinematic elements' motions affects the simulation of the dynamic elements. The present invention provides a compensation for dynamic elements whose motion is unrealistic because of the motion of the kinematic elements and does not require individual manipulation of the dynamic elements on a per frame basis to achieve the desired motions.

The present invention is directed to a method of simulating relative motion of objects in computer animation. That process includes providing a motion of a kinematic object, providing at least one dynamic object associated with the kinematic object, where motions of the at least one dynamic object are based on the motion of the kinematic object, and selectively manipulating the motions of the at least one dynamic object to simulate physical motion.

The method selectively manipulates the dynamic objects by compensating for unreasonable motions of the dynamic objects when the kinematic object undergoes exaggerated motion. More particularly, that compensation occurs when the exaggerated motion includes accelerations that are unrealistic for humans.

In addition, the method can also compensate for the unreasonable motions of the dynamic objects when the kinematic object undergoes accelerated motions above a predetermined limit. Thus, the compensation need not occur until the acceleration of the kinematic object is greater than a certain limit.

The method is applicable to when the kinematic object is an animated character and the dynamic elements are coupled to the animated character. Additionally, the dynamic elements may represent hair or clothing attached to the animated character.

Also, the dynamic objects may include a first set of dynamic objects and a second set of dynamic objects and in the step of selectively manipulating the motions of the dynamic object, each set of dynamic objects is manipulated with respect to separate reference points on the kinematic object. In addition, the dynamic objects may selectively manipulated with reference to a plurality of reference points coupled to those dynamic objects.

The above and other objects, features and advantages of the invention will become apparent from the following description of the preferred embodiment taken in conjunction with the accompanying drawings.

BRIEF DESCRIPTION OF THE DRAWINGS

FIG. 1 illustrates a kinematic character.

DESCRIPTION OF THE PREFERRED EMBODIMENTS

The present invention is directed to a method for controllably coupling kinematic character motions to dynamically simulated elements. This control is accomplished through the use of an Inertial Field Generator (IFG). The use of the IFG allows an animator to control how kinematic element's motions affects the simulation of the dynamic elements.

In the context of the present application, kinematic and dynamic objects, or elements, can be, in the preferred embodiments, collections of data points having connections between the data points. These collections of data points are used to form elements of computer animation images. These data points are entered into a computer system and those data points are used to form the images. Through manipulation of the data points, the images are changed on a per frame basis to simulate motion. The kinematic objects described herein are preferably characters that are animated and interact with other elements in the animation scene.

Figure 1A:
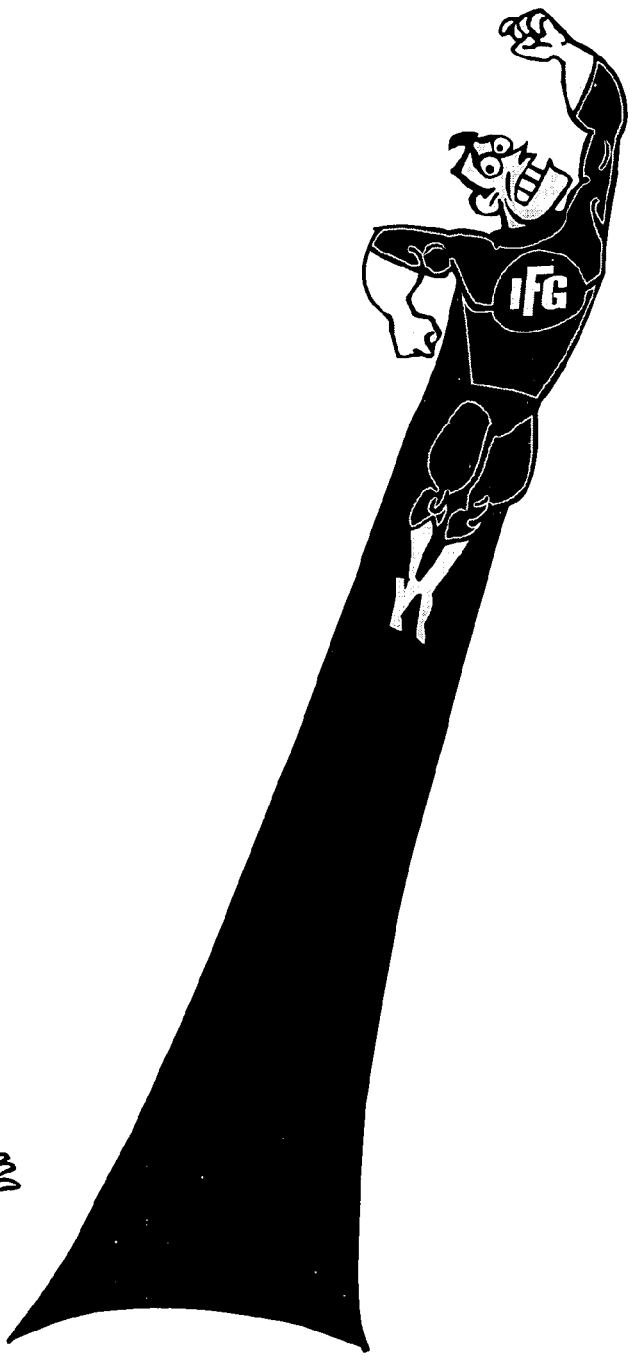
FIG. 1a is an illustration of a kinematic character having dynamic elements.
Figure 1B:
FIG. 1b presents the illustration of FIG. 1a when the kinematic character undergoes unrealistic motion.

In the superhero example illustrated in FIGS. 1a and 1b, an IFG is used so that the cape would "feel" only a small fraction (or even none at all) of the superhero's upward acceleration, and would thus not stretch appreciably. Thus, the use of the IFG would allow the superhero's cape to appear as it does in FIG. 1a, even though the superhero is being simulated as moving through unrealistic motion.

Another example would be a character wearing a shirt who jumps off a cliff. In that case, the animator might exaggerate the character's motion so that the fall is faster than gravity allows for. Yet, visually the animator may wish to avoid the shirt flying up over the character's head as would realistically happen. Likewise, a fur-covered character might wave its arms extremely energetically, but the animator may want the dynamic fur's motion to reflect only some portion of this vigorous motion.

Figure 2:
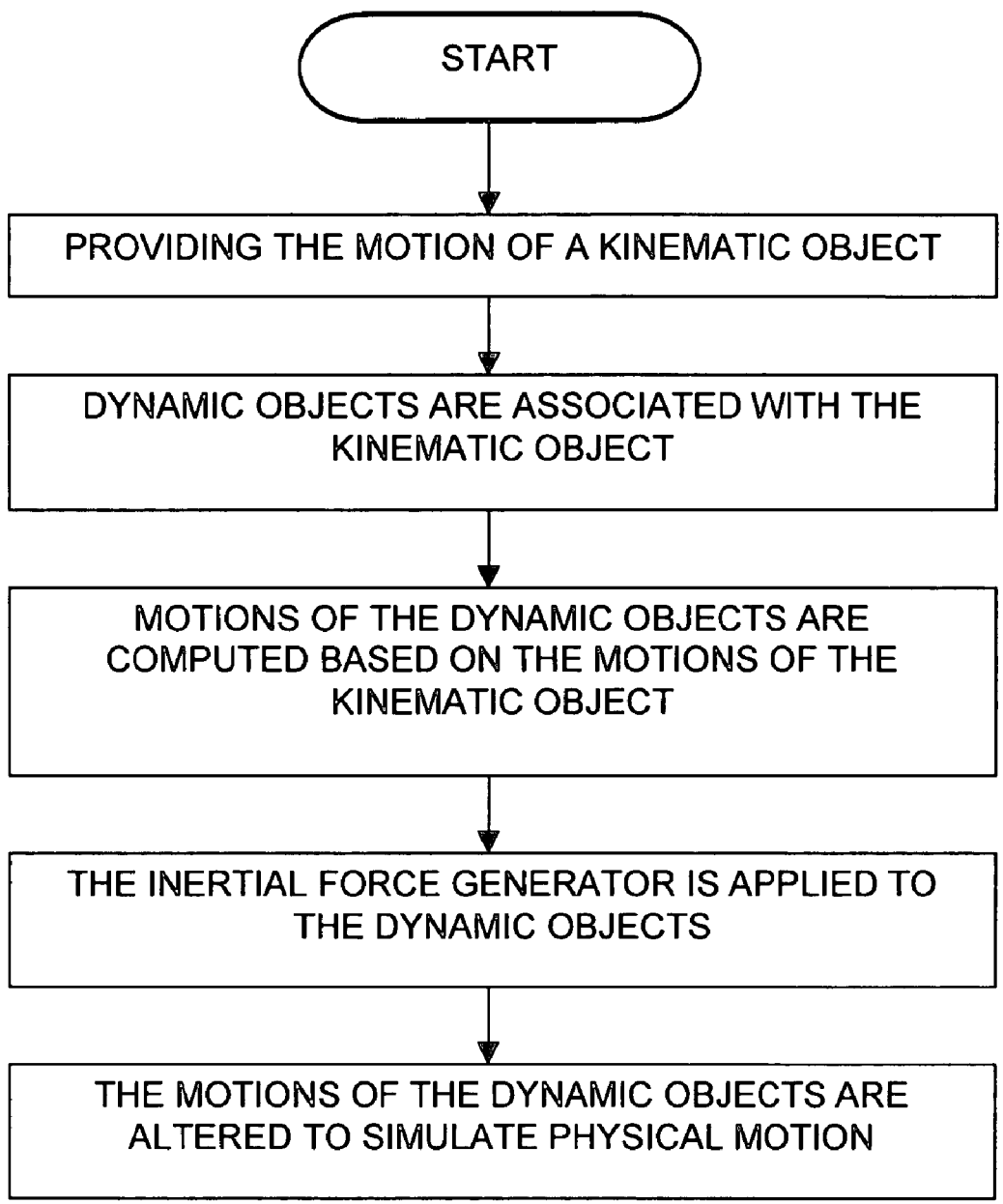
FIG. 2 is a flow chart illustrating the general method of the present invention.

The methodology employed to apply the IFG will now be discussed with respect to FIG. 2. FIG. 2 illustrates the general method used. First, the motion of a kinematic object is provided. This is supplied by the animator and is usually provided on a per frame basis. Dynamic objects are associated with the kinematic object, where the motions of dynamic objects are based on the motion of the kinematic object. The kinematic object can be an animated character and the dynamic objects are attributes of that character, such as hair and/or clothing. Lastly, the motions of the dynamic objects are selectively manipulated to simulate physical motion. The IFGs allow the motions of the dynamic objects to be controlled so that their motion does not become unrealistic even when the kinematic object moves in ways that are not possible in the unanimated world.

A common component of all physically-based simulation is that forces acting on the dynamic elements are part of the input to the simulation. An IFG is a specifically constructed force-field that is added to the simulation, in such a way as to compensate for unwanted accelerations in a kinematic character's animation. An IFG works by measuring acceleration in the kinematic character, and adding some portion of that acceleration to the dynamic elements. Essentially then, an IFG is a coupling device between a kinematic character, and a dynamic element whose motion is likely to be highly dependent on the kinematic character's motion.

Figure 3:
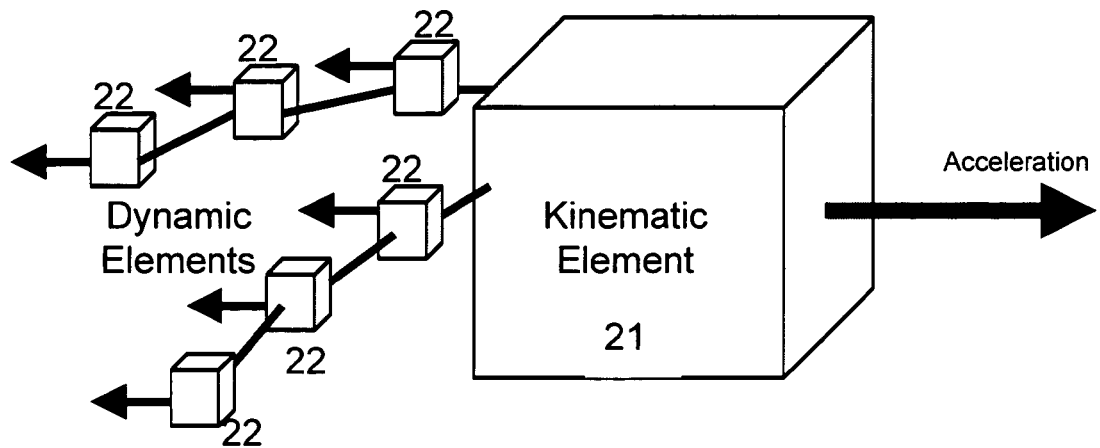
FIG. 3 is a schematic showing the connections between a kinematic element and dynamic elements, and the response of the dynamic elements based on the acceleration of the kinematic element.
Figure 4:
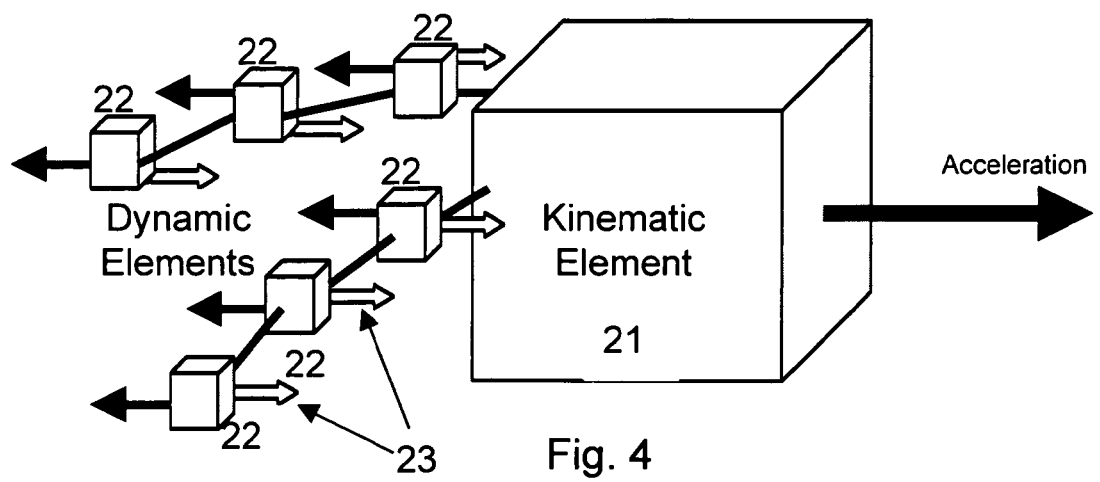
FIG. 4 schematic showing the connections between a kinematic element and dynamic elements, and the application of the inertial field generator to the dynamic elements to compensate for the reaction of the dynamic elements to the acceleration of the kinematic element.

For simplicity, it is assumed that the dynamic element consists of n particles, with the ith particle having mass $m_i$. Such dynamic elements consisting of particles 22 are illustrated in FIGS. 2 and 3. While the examples provided herein discuss the representation of the dynamic elements as a series of particles, IFGs that act on continuum objects are just as easily defined. Each particle i in the dynamic element is associated with a predetermined motion of a reference point $p_i \in R^3$, that is, at time t, the reference point for the ith particle has location $p_i(t)$. In FIGS. 2 and 3, the reference point is denoted by element 21.

The motion of the reference points defines an acceleration field, some portion of which the animator wants to pass along to the dynamic particles. Thus, for each particle i a filtering function $G_i$; is defined whose input and output is an acceleration in $R^3$. Given these definitions, at time t the IFG imparts on particle i a force $f_i(t)$ defined by:

$$f_i(t) = m_i G_i(\ddot{p}_i(t)) \quad (1)$$

where $$\ddot{p}_i(t) = \frac{d}{dt^2} p_i(t)$$

is the acceleration of $p_i$. This force is illustrated by the white arrows 23 shown in FIG. 3. Examples of different IFGs and their use will now be described.

In a first embodiment, IFG uses a single reference point. In the example of the superhero, FIG. 1, assume that the superhero is accelerating upward abruptly. His cloth cape consists of a number of dynamic particles. For each particle, the same reference point $p_i=p_c$ is chosen, where $p_c$ is the location of a point approximately centered in the superhero's body.

If $G_i$ is defined as:

$$G_i(\vec{p}_c(t)) = \alpha \vec{p}_c(t) \qquad (2)$$

then for $\alpha=1$, the motion of $p_c$ is completely canceled out. That is, the entire cape feels an accelerating force that exactly matches the motion of $p_c$ over time. When the superhero accelerates upward at 100G's, a compensating 100G upward acceleration is imposed on the entire cape. As a result, the cape does not stretch appreciably—in fact, it does not react to the superhero's upward bound except to move exactly upward with the superhero. By varying a, the amount of the superhero's acceleration that is imparted to the cape can be controlled.

Additionally, the output force from an IFG need not act in the same direction as the input acceleration. For example, if we wish the IFG to only affect vertical accelerations, then we could write $$G_i(\vec{p}_c(t)) = \alpha(\vec{p}_c(t) \cdot \hat{z})\hat{z} \qquad (3)$$

where $\hat{z}$ is a unit vector along the vertical axis.

IFGs can also be more selective in their filtering ability. For example, suppose the animator wants the IFG to only compensate for accelerations that are unrealistic for humans. A normal human is limited to accelerations of only a few G's (say three): so that one might wish to compensate for the superhero's acceleration only to the extent that it exceeds $3 \cdot 980 = 2940$ cm/s². Setting $\alpha_M = 2940$, the filter can be written:

$$G_i(\vec{p}_c(t)) = \begin{cases} 0 & \text{if } \|\vec{p}_c(t)\| < a_M \\ \left(1 - \frac{a_M}{\|\vec{p}_c(t)\|}\right)\vec{p}_c(t) & \text{if } \|\vec{p}_c(t)\| \geq a_M \end{cases} \qquad (4)$$

For input accelerations $\vec{p}_c(t)$ with magnitude less than $\alpha_M$, the output force is zero since $G_i$ is zero. As the magnitude of $\vec{p}_c(t)$ reaches and exceeds $\alpha_M$, the IFG begins outputting a greater and greater fraction of $\vec{p}_c(t)$ onto the cloth. In this way, unrealistic motions of the kinematic character that cause problematic effects in the dynamic elements can be avoided.

In another embodiment, an IFG may use multiple reference points. Greater flexibility can be achieved by allowing each $p_i$ to track a different point on the kinematic character. Consider a character with long dynamic hair on its arms. The character moves it arms in different directions very energetically. To prevent the hair on the arms from stretching due to high accelerations of the arms, an IFG is employed.

However, since the right arm might move independently from the left arm, the hair on the right arm has to use a different reference point from the hair on the left arm. In fact, for this example, all the points in a given strand of hair should use $p_i(t)=p_r(t)$ where $p_r(t)$ is the root point of the hair (specifically, the point on the body that the hair is attached to). In general, each strand of hair is coupled to the motion of a different point $p_r(t)$. Obviously, the motions of points on the left arm can be quite different than the motion of points on the right arm. Using multiple independent reference points allows an IFG to take into account simultaneous motions by parts of the body that differ greatly in their direction and or intensity.

In another embodiment, the IFG uses a varying filter function. In the examples above, each filter function $G_i$ was the same. If one wished the response of the IFG to vary over a character, it is a simple matter to let the filter function $G_i$ vary from point to point. This might be done if the animator wished to smoothly vary the effects of the IFG over a character. For example, an animator might wish to have the effects of an IFG applied to the furry character's arms, but taper off in intensity for the fur on the torso.

IFGs greatly reduce excessively unrealistic motions from dynamic elements. Even when a kinematic character's motion is completely plausible, the IFG is still invaluable because it allows the animator to control how much of the character's base motion is transferred to the dynamic element. IFGs are easily applied to any sort of dynamic element (including, but not limited to, dynamic clothing, hair, fur, appendages, water, and vapor).

Although the embodiments discussed above provide for filtering function with certain parameters, the filtering functions $G_i$ can be specified in terms of an arbitrary number of control parameters. Additionally, both the filtering functions $G_i$ and the reference points can be functions of which dynamic particles they apply to. Thus, individual portions of the dynamic elements can be controlled to a fine degree.

Although embodiments of the present invention have been described in detail, it will be understood that the present invention is not limited to the above-described embodiments, and various modifications in design may be made without departing from the spirit and scope of the invention defined in claims.

What is claimed is:

1. A method for simulating relative motion of objects, the method comprising:
   receiving, at one or more computer systems, an animation sequence indicative of motion of a first object;
   selectively manipulating during a portion of the animation sequence, with one or more processors associated with the one or more computer systems, motion of a second object determined from a computer simulation of the second object according to a model that defines physics of the simulation in response to a compensation force configured to act on the second object during the portion of the animation sequence to be inconsistent with the model when motion of the first object during the portion of the animation sequence satisfies one or more predetermined conditions, the compensation force being separate from any forces determined to be acting on the second object by the model; and
   generating, with the one or more processors associated with the one or more computer systems, information indicative of the manipulated motion of the second object.

2. The method of claim 1 wherein selectively manipulating during the portion of the animation sequence the motion of the second object in response to the compensation force configured to act on the second object during the portion of the animation sequence to be inconsistent with the model comprises compensating for motions of the second object that are consistent with the model.

3. The method of claim 2 wherein compensating for the motions of the second object comprises compensating for the motions of the second object when the motion of the first object comprises accelerations that are unrealistic for humans according to the model defining the physics of the simulation.

4. The method of claim 2 wherein compensating for the motions of the second object comprises compensating for the motions of the second object when the first object undergoes accelerated motions above a predetermined limit.

5. The method of claim 1 wherein the second object comprises a first set of objects correlated based on a correspondence to motion of a first reference point on the first object and a second set of objects correlated based on the correspondence to motion of a second reference point on the first object; and wherein selectively manipulating during the portion of the animation sequence the motion of the second object in response to the compensation force configured to act on the second object during the portion of the animation sequence to be inconsistent with the model comprises selectively manipulating motions of the first set of objects with respect to motion of the first object at the first reference point and selectively manipulating motions of the second set of objects with respect to motion of the first object at the second reference point.

6. The method of claim 1 wherein the second object comprises a plurality of objects, each object in the plurality objects correlated based on a correspondence to motion of a different reference point in a plurality of reference points on the first object; and wherein selectively manipulating during the portion of the animation sequence the motion of the second object in response to the compensation force configured to act on the second object during the portion of the animation sequence to be inconsistent with the model comprises manipulating the motions of each of the plurality of objects with respect to motion of the first object at the different reference point in the plurality of reference points corresponding thereto.

7. The method of claim 6 wherein the first object comprises an animated character; and wherein the plurality of dynamic objects are physically coupled to the animated character at different points on the animated character.

8. The method of claim 6 wherein the manipulating the motions of each of the plurality of objects comprises compensating for motions of the plurality of objects that are consistent with the model defining the physic of the simulation when the motion of the first object is exaggerated according to the model defining the physics of the simulation.

9. The method of claim 1 wherein selectively manipulating during the portion of the animation sequence the motion of the second object in response to the compensation force configured to act on the second object during the portion of the animation sequence to be inconsistent with the model comprises manipulating the motion of the second object in a subset of directions determined by the model defining the physics of the simulation in response to acceleration of the first object.

10. The method of claim 1 further comprising:
displaying the second object as at least one of a representation of hair attached to the first object or a representation of cloth associated with the first object.

11. A non-transitory computer-readable medium storing computer-executable code for simulating relative motion of objects, the computer-readable medium comprising:

code for receiving an animation sequence indicative of motion of a first object;

code selectively for manipulating during a portion of the animation sequence motion of a second object determined from a computer simulation of the second object according to a model that defines physics of the simulation in response to a compensation force configured to act on the second object during the portion of the animation sequence to be inconsistent with the model when motion of the first object during the portion of the animation sequence satisfies one or more predetermined conditions, the compensation force being separate from any forces determined to be acting on the second object by the model; and code for generating information indicative of the manipulated motion of the second object.

12. The non-transitory computer-readable medium of claim 11 wherein the code for selectively manipulating during the portion of the animation sequence the motion of the second object in response to the compensation force configured to act on the second object during the portion of the animation sequence to be inconsistent with the model comprises code for compensating for motions of the second object that are consistent with the model.

13. The non-transitory computer-readable medium of claim 12 wherein the code for compensating for the motions of the second object comprises code for compensating for the motions of the second object when the motion of the first object comprises accelerations that are unrealistic for humans according to the model defining the physics of the simulation.

14. The non-transitory computer-readable medium of claim 12 wherein the code for compensating for the motions of the second object comprises code for compensating for the motions of the second object when the first object undergoes accelerated motions above a predetermined limit.

15. The non-transitory computer-readable medium of claim 11 wherein the second object comprises a first set of objects correlated based on a correspondence to motion of a first reference point on the first object and a second set of objects correlated based on the correspondence to motion of a second reference point on the first object; and wherein the code for selectively manipulating during the portion of the animation sequence the motion of the second object in response to the compensation force configured to act on the second object during the portion of the animation sequence to be inconsistent with the model comprises code for selectively manipulating motions of the first set of objects with respect to motion of the first object at the first reference point and code for selectively manipulating motions of the second set of objects with respect to motion of the first object at the second reference point.

16. The non-transitory computer-readable medium of claim 11 wherein the second object comprises a plurality of objects, each object in the plurality objects correlated based on the correspondence to motion of a different reference point in a plurality of reference points on the first object; and wherein the code for selectively manipulating during the portion of the animation sequence the motion of the second object in response to the compensation force configured to act on the second object during the portion of the animation sequence to be inconsistent with the model comprises code for manipulating the motions of each of the plurality of objects with respect to motion of the first object at the different reference point in the plurality of reference points corresponding thereto.

17. The non-transitory computer-readable medium of claim 16 wherein the first object comprises an animated character; and wherein the plurality of objects are physically coupled to the animated character at different points on the animated character.

18. The non-transitory computer-readable medium of claim 16 wherein the code for manipulating the motions of each of the plurality of objects comprises code for compensating for motions of the plurality of objects that are consistent with the model defining the physic of the simulation when the motion of the first object is exaggerated according to the model defining the physics of the simulation.

19. The non-transitory computer-readable medium of claim 11 wherein the code for selectively manipulating during the portion of the animation sequence the motion of the second object automatically to be inconsistent with the model comprises code for manipulating the motion of the second object in a subset of directions determined by the model defining the physics of the simulation in response to acceleration of the first object.

20. The non-transitory computer-readable medium of claim 11 further comprising:
  code for representing the second object as at least one of hair attached to the first object or cloth associated with the first object.

* * * * *